United States Patent
Barros et al.

(10) Patent No.: US 11,505,741 B2
(45) Date of Patent: Nov. 22, 2022

(54) SOL-GEL PROCESS FOR SYNTHESISING A LUMINESCENT MATERIAL WITH GENERAL FORMULATION: AXBYFZ:MN

(71) Applicants: LINXENS HOLDING, Mantes-la-Jolie (FR); UNIVERSITE BLAISE PASCAL CLERMONT II, Clermont-Ferrand (FR); SIGMA CLERMONT, Aubiere (FR); CENTRE NATIONAL DE LA RECHERCHE SCIENTIFIQUE, Paris (FR)

(72) Inventors: Anthony Barros, Chauriat (FR); Rodolphe Deloncle, Le Cendre (FR); Jérôme Deschamps, Aubiere (FR); Geneviève Chadeyron, Cebazat (FR); Damien Boyer, Cebazat (FR); Philippe Boutinaud, Cournon d'Auvergne (FR)

(*) Notice: Subject to any disclaimer, the term of this patent is extended or adjusted under 35 U.S.C. 154(b) by 1210 days.

(21) Appl. No.: 15/775,524

(22) PCT Filed: Nov. 10, 2016

(86) PCT No.: PCT/FR2016/052938
§ 371 (c)(1),
(2) Date: Nov. 6, 2018

(87) PCT Pub. No.: WO2017/081428
PCT Pub. Date: May 18, 2017

(65) Prior Publication Data
US 2019/0071601 A1    Mar. 7, 2019

(30) Foreign Application Priority Data

Nov. 13, 2015 (FR) .................................. 1560857

(51) Int. Cl.
*C09K 11/61* (2006.01)
*B82Y 40/00* (2011.01)

(52) U.S. Cl.
CPC .......... *C09K 11/616* (2013.01); *C09K 11/617* (2013.01); *B82Y 40/00* (2013.01)

(58) Field of Classification Search
CPC ............................ C09K 11/616; C09K 11/617
See application file for complete search history.

(56) References Cited

U.S. PATENT DOCUMENTS 10,047,286 B2 * 8/2018 Du ....................... C09K 11/617
2010/0142189 A1   6/2010 Hong et al.
(Continued)

FOREIGN PATENT DOCUMENTS

WO    2013121355 A1    8/2013
WO    20130121355 A1   8/2013

OTHER PUBLICATIONS

Boyer. Powders and Coatings of LiYF4:Eu3+ Obtained via an Original Way Based on the Sol-Gel Process. Chem. Mater. 2004, 16, 13, 2518-2521 (Year: 2004).*

(Continued)

*Primary Examiner* — Matthew E. Hoban

(57) ABSTRACT

A sol-gel process for synthesizing a luminescent material has a general formulation: AxByFz:Mn. A is an element of group 1, 2, 4, $NR_4$ or a combination of elements belonging to those groups, with R=H or an alkyl chain or a combination of chains. B is an element of group 5, 6, 13, 14 and $0<x\leq5$, $0<y\leq2$, $5\leq z\leq7$. The sol-gel process includes a) producing a liquid precursor (2, 3) in an alcohol solution by mixing metal reagents (1) with manganese, the mixture being made at pH<8; b) obtaining a solid precursor (5, 6) from the liquid precursor (2, 3) obtained in step a), by eliminating (4) the solvent; c) crystallizing (7, 70) the solid precursor (5, 6) obtained in step b) by thermal treatment in fluorinated atmosphere; and d) retrieving the fluorescent crystalline powder (8) obtained at an end of step c).

11 Claims, 1 Drawing Sheet

(56) References Cited

U.S. PATENT DOCUMENTS

| | | |
|---|---|---|
| 2015/0166887 A1 | 6/2015 | Murphy et al. |
| 2015/0184067 A1 | 7/2015 | Kajikawa et al. |
| 2016/0090528 A1* | 3/2016 | Yoshida ............... C09K 11/617 257/98 |
| 2016/0186053 A1* | 6/2016 | Min .................... C09K 11/025 252/301.4 F |
| 2016/0244663 A1* | 8/2016 | Murphy ............... C09K 11/617 |
| 2018/0163126 A1* | 6/2018 | Murphy ............... C09K 11/025 |

OTHER PUBLICATIONS

Boyer et al., "Comparison between the optical properties of sol-gel process and solid state reaction derived LiYF4: Eu<3+> powders", Optical Materials, Elsevier Science Publishers B.V. Amsterdam, NL, vol. 28, No. 1-2, Jan. 1, 2006, pp. 53-57.

Fujihara et al., "Sol-gel synthesis of inorganic complex fluorides using trifluoroacetic acid", Journal of Fluorine Chemistry, vol. 105, 2000, pp. 65-70.

Written Opinion for corresponding International Application No. PCT/FR2016/052938, dated Feb. 9, 2017.

Written Opinion for related international application No. PCT/FR2016/052938, dated Feb. 9, 2017.

International Search Report for related international application No. PCT/FR2016/052938, dated Feb. 9, 2017.

Boyer, D. et al.: "Comparison between the optical properties of sol-gel process and solid state reaction derived LiYF4: Eu 3+powders", Optical Materials, Elsevier Science Publishers B. V. Amsterdam, NL, vol. 28, No. 1-2, Jan. 1, 2006 (Jan. 1, 2006), pp. 53-57.

Shinobu Fujihara et al: "Sol gel synthesis of inorganic complex uorides using trifluoroacetic acid", Mar. 24, 2000 (Mar. 24, 2000), XP055283195, URL:http://www.sciencedirect.com/science/article/pii/S0022 II 3900002657/pdfft? md5= d8d20c866a579f2876cb434c0b6065b5&p • d=I -s2.0-S002213900002657-main. pdf [retrieved on Jun. 23, 2016].

* cited by examiner

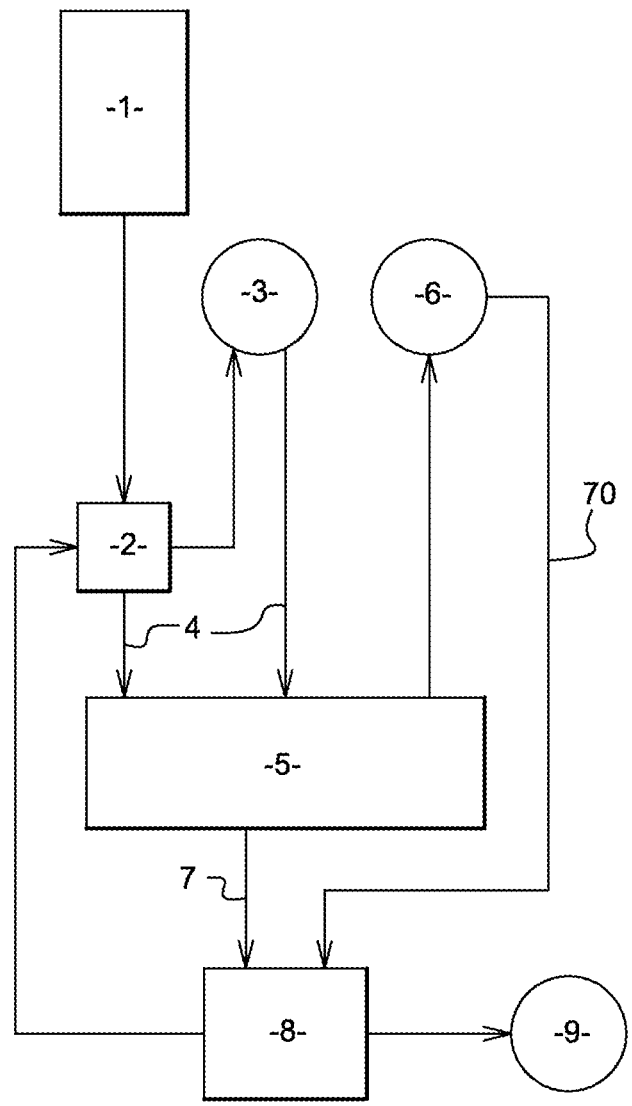

SOL-GEL PROCESS FOR SYNTHESISING A LUMINESCENT MATERIAL WITH GENERAL FORMULATION: AXBYFZ:MN

CROSS-REFERENCE TO RELATED APPLICATIONS

The present application is a national stage entry, filed May 11, 2018, of international application no. PCT/FR2016/052938, filed on Nov. 10, 2016, which claims priority to French application no. 1560857, filed on Nov. 13, 2015.

STATEMENT REGARDING FEDERALLY SPONSORED RESEARCH OR DEVELOPMENT

Not applicable.

PARTIES TO A JOINT RESEARCH AGREEMENT

Not applicable.

SEQUENCE LISTING

Not applicable.

STATEMENT REGARDING PRIOR DISCLOSURES BY THE INVENTOR OR A JOINT INVENTOR

Not applicable.

BACKGROUND OF THE INVENTION

This invention refers to a sol-gel process for synthesising a luminescent material with general formulation: AxByFz:Mn.

Here, A represents an element belonging to one of the following groups of the periodic table of elements also known as the Mendeleev's table: groups 1, 2, 4, $NR_4$ or a combination of elements, given that R is hydrogen or an alkyl chain, either alone or in combination. B represents an element belonging to one of groups 5, 6, 13, 14, x is a value greater than zero and less than or equal to five, y is a value greater than zero and less than or equal to two and z is greater than or equal five and less than or equal to seven.

Luminescent materials, i.e. materials that emit light under the effect of excitation, are used in the field of lighting, lasers, medical imaging among others. Luminescent materials are particularly used in the production of Light-Emitting Diodes or LED, the commonly used acronym. For environmental reasons, cost, lifespan, consumption and ease of use, LEDs are increasingly being used for "traditional" lighting, in replacement of, for example, the halogen or incandescent lamps. White LEDs, in particular, provide lighting similar to natural light.

Most white LEDs are manufactured by combining a semi-conductor emitting between 400 nm and 500 nm with a yellow/green phosphor emitting between 480 nm and 650 nm. For manufacturing white LEDs with high colour rendering index or CRI, a red component is required to be added for strengthening the emission between 600 nm and 700 nm. Presently, compounds of the nitrides family doped with europium are the solution of choice for this red component. They are characterised by an intense red emission and thermal stability. However, these compounds are expensive and difficult to produce. In addition, an emerging solution comprises using complex fluoro compounds of the general formula $AxByFz:Mn^{4+}$. These materials have a narrow emission range that favour obtaining a high CRI and are less expensive due to the lack of rare earth elements in their composition.

From US-A-2015 0166 887, we know of a method for preparing a luminescent material through co-precipitation reactions involving fluorinated precursors in solution in hydrofluoric acid. This acid is considered extremely corrosive and toxic, which requires significant safety constraints during its storage and use.

Therefore, other modes of production were explored. Among these, the sol-gel type processes allow production of luminescent materials at low temperature, i.e. temperature lower than that of conventional ceramisation methods. For example, in the case of silica, ceramisation is possible at temperatures below 100° C. This type of process is based on inorganic polymerisation, based on precursors in solution, which results in an organometallic network, precursor of the final solid. During the process, colloids are formed along with polymeric gels. After drying and sintering, it is possible to obtain fibres, monoliths or powders.

In the case manufacturing of non-fluorinated luminescent materials, the Audrey Caumond-Potdevin thesis ("synthesis by sol-gel method and characterisation of nanostructured luminescent materials applicable in a new generation of clean lamps" of June 2007) tells us about a method wherein metal alkoxides are used in solution in an organic solvent as a precursor. In general, the method comprises hydrolysis type reactions and then condensation type reactions. These combined reactions lead to the development of molecules having a three-dimensional structure.

The Jessica Labèguerie-Egea thesis, ("synthesis of rare earth doped fluorides by soft chemistry for optical applications" 2007), also describes a sol-gel process using isopropanol as solvent and trifluoroacetic acid as a fluorinating agent for obtaining single fluorinated derivatives, such as $CaF_2$, doped with europium. Damien Boyer et al, optical materials 28, 2006, 53-57, also talks about the production of a fluorescent powder, in this case a fluoride of lithium and yttrium doped with europium, from a heterometallic alkoxide solution. Here, the fluorine source is trifluoroacetic acid introduced at the beginning of the process, which is carried out in a basic medium. This powder is used in the field of lasers among others.

The structure of matrices of these various processes is characterised by crystallographic sites that easily incorporate rare earth elements. These sites are unsuitable for receiving transition ions with a $d^3$ electron configuration such as $Cr^{3+}$ or $Mn^{4+}$. In order to achieve performance levels required for application on LEDs, it is necessary to obtain more fluorinated structures, i.e. containing more than four fluorine atoms, whose crystal field provides optimised luminescence of manganese. In addition, the use of rare earth elements is disadvantageous in terms of costs.

In other words, it is worth producing a fluoride without rare earth elements, having at least five fluorine atoms in the matrix structure, easy to produce and to store.

The invention specifically aims to propose a sol-gel synthesis process, easy to use, without organic source of fluorine, without hydrofluoric acid and without rare earth elements.

SUMMARY OF THE INVENTION

For this purpose, the aim of this invention is a sol-gel process for synthesising a luminescent material with general formulation: AxByFz:Mn, where A is an element of the group 1, 2, 4, $NR_4$ or a combination of elements belonging to these groups, where R=H or an alkyl chain or a combination of chains, where B is an element of the group 5, 6, 13, 14, and $0<x\leq5$, $0<y\leq2$, $5\leq z\leq7$, characterised in that it comprises at least the following steps:
  a) production of a liquid precursor, in alcoholic solution, by mixing metal reagents, selected from metal salts such as halides, nitrates, hydrides, amides, acetates, carbonates or alkoxides, with manganese, and the mixing is performed at pH<8,
  b) obtaining a solid precursor from the liquid precursor obtained in step a) by eliminating the solvent,
  c) crystallisation of the solid precursor obtained in step b), by heat treatment in fluorine atmosphere,
  d) recovery of fluorescent crystalline powder obtained at the end of step c).

With such a process, we do not use dissolved fluorine source, or rare earth element. Here, the fluorine source is introduced only in the penultimate step, thus just before recovery of the final product, at the time of the heat treatment. In other words, the process takes place in the absence of dissolved fluorine. Its safety is improved and the storage and handling also become easier.

According to the aspects of the invention that are advantageous but not mandatory, such a process may comprise one or more of the following characteristics:
  During step a), the pH is maintained below 8 by adding an acid, selected from, but not limited to, carboxylic acids such as formic acid, acetic acid, propionic acid, citric acid, tartaric acid, oxalic acid, sulfonic acids such as benzenesulfonic acid, paratoluenesulfonic acid, anhydrous forms of acids, hydrochloric acid in solution in ethyl ether, in dioxane or in gaseous form.
  During step a), the pH is maintained below 8 by adding a carboxylic acid: acetic acid.
  Step a) is performed at a temperature between 15° C. and the boiling temperature of the solvent used.
  The liquid precursor, obtained in step a) is, if necessary, stored for subsequent use in step b).
  The solid precursor, obtained in step b) is, if necessary, stored for subsequent use in step c).
  The metal reagents used in step a) are all selected from the alkoxides.
  The metal reagents used in step a) are mixtures of metal salts.
  Step c) is performed at a temperature between 100° C. and 1,000° C. for at least 30 minutes.
  The fluorinated agent used in step c) for generating a fluorine atmosphere is selected from: $F_2$, HF, $BrF_3$, $TbF_4$, $XeF_2$, XeF4 and $XeF_6$, $NH_4F$, $NH_4HF_2$, $CoF_3$, $SbF_3$, $SbF_5$, $ArF_3$, KrF, $BrF_5$, ClF, $ClF_3$ and $ClF_5$, $HFO_3S$, $AuF_3$, $IF_5$, $MnF_3$ and $MnF_4$, NOF and $NO_2F$ $NF_3$, $ClO_3F$, $PtF_6$, $SeF_4$, $SiF_4$, $AgF_2$, $SF_4$, $SF_6$, KF, $PbF_2$, $ZnF_2$, $SnF_2$, $CdF_2$ alone or in combination.
  During step c), the atmosphere contains at least 1% of fluorinated agent.
  During step c), the fluorine atmosphere is static or dynamic.
  At the end of step d), the resulting particles are reintroduced in a liquid precursor, at step a).
  During this new step a), the liquid precursor is selected to provide double luminescence, for magnetic properties or for other characteristics.

BRIEF DESCRIPTION OF THE DRAWING

The invention will be better understood and its other advantages will become clearer on reading the description of several embodiments of the invention, given as examples (non-exhaustive) and with reference to the following drawing wherein:
  FIG. 1 is a simplified diagram showing various steps of the process compliant with an embodiment of the invention.

DETAILED DESCRIPTION OF THE INVENTION

With reference to FIG. 1, the production of a compound will be described based, in general, on transition metals and, in particular, on an advantageous embodiment of the invention, with among others of manganese, given that the invention also finds its application with, for example, chromium, iron or any other transition element of groups 3 to 12 of the periodic table of elements. It is understood that the use of one or the other transition metal provides luminescence in different spectral ranges, and thereby in different colours. In all cases, luminescence is obtained through excitation of the transition member in a range from ultraviolet to infrared, followed by radiative de-excitation.

As a preferred example, use of manganese as one of the metal reagents provides luminescence in the red range, or between 600 nm and 700 nm.

It should be borne in mind that the final fluorinated material, thereby the obtained luminescent crystalline powder, is a compound of formulation: $AxByFz:C^{m+}$ In general, families of matrices used for obtaining a luminescent material are those with:
A=element of the group 1, 2, 4, $NR_4$ or a combination of elements belonging to these groups where R=H or an alkyl chain of small size or a combination of chains. Here, the term "small size" refers to an alkyl chain having from 1 to 4 carbon atoms.
B=element of the group 5, 6, 13, 14.
$C^{m+}$=Transition metal $3d^n$ (where n=[1; 10]) with a degree of oxidation m, transition metals means elements that have an atomic number between 21 and 30.
$0<x\leq5$, $0<y\leq2$
$5\leq z\leq7$.

In the invention, A, B, C are also simple or complex metal reagents. This term means as many metals such as manganese, chromium, iron or any other transition element as salts of these metals or a mixture of these metals. As examples, including but not limited to, we can list halides, nitrates, hydrides, amides, acetates, carbonates or, preferably in an embodiment of the invention, alkoxides.

These metal reagents are known as themselves and are either generated in situ prior to implementation of the process or are of commercial origin. In other words, the user procures them upstream, from a supplier.

The preferable use of metal alkoxides as metal reagents allows making a heteroatom polymeric network in solution, during step a), which subsequently promotes formation of the desired final matrix. In this context, it is possible to use metal reagents other than metal alkoxides, as previously mentioned.

Here, the process, which is the subject of the invention, will be described by using metal alkoxides.

During a first step, shown under reference 1, the metal sources A, B and manganese are all made to react with alcohol. The alcohol or mixture of alcohols is chosen based on the metal reagents in order to ensure optimum solubilisation.

The reaction is carried out under neutral atmosphere, in a stirred reactor and at a temperature between 15° C. and the boiling temperature of the solvent and for a reaction time ranging from a few minutes to several hours. Preferably, the optimal reaction time is close to 4 hours. Manganese, in contrast to rare earth elements, is pH sensitive. In a basic medium, manganese may be oxidised by dissolved oxygen and form $MnO_2$. Such a property is known, it is also used in a "Winckler' method for measuring dissolved oxygen. In other words, the reaction in step a) must be performed in a non-basic medium, i.e. in this case with pH less than 8. Advantageously, the pH is between 1 and 7, preferentially close to 5. Moreover, the reaction must be performed in an anhydrous environment. Therefore, the pH is regulated by adding an anhydrous acid, preferably selected from, but not limited to, carboxylic acids such as formic acid, acetic acid, propionic acid, citric acid, tartaric acid, oxalic acid, from sulfonic acids such as benzenesulfonic acid, paratoluenesulfonic acid, from anhydrous forms of acids, from hydrochloric acid in solution in ethyl ether, in dioxane or in gaseous form.

Preferably, acetic acid is used.

When reaction is complete, we get a liquid precursor 2 under normal temperature and pressure conditions. It is understood that step 1 can be carried out at any time and/or place relative to the remainder of the process. Thus, the liquid precursor 2 can be easily stored, as illustrated by reference 3. It is thus possible to shift production of the liquid precursor 2. In this case, the storage and/or transport conditions should not be able to alter the liquid precursor and the remainder of the process. It should especially be borne in mind that the liquid precursor is flammable and must be stored away from light.

Alternatively, the liquid precursor 2 is used as soon as it is produced, either continuously or discontinuously.

Second step of the process, illustrated by arrows 4, is then implemented, either based on the produced liquid precursor 2 or from the stored liquid precursor 3.

The liquid precursor will subsequently be referenced 2 if used directly and referenced 3 if it is a previously stored liquid precursor.

This step 4 is used to obtain a solid precursor 5. For this, the alcoholic solvent is removed. As an advantage, but not exclusively, the alcohol is evaporated by heating to a temperature corresponding to the boiling temperature of the alcoholic solvent, this temperature has no effect on other components of the liquid precursor. Alternatively, the solvent is eliminated by evaporation under reduced pressure, spray drying, lyophilisation or any other technique known as such.

The purpose of this step 4 is to initiate and solidify a reaction intermediate that comprises elements A, B and C. For this, the step 4 parameters are variable and a function of the solvent used and the elimination method selected.

Once the solid precursor 5 is obtained, and in a manner similar to the liquid precursor 2, it is possible to store 6 the solid precursor for future use and/or in another location, as is apparent from FIG. 1.

It must be noted that, until now, the process did not use fluorinated agent in solution. In other words, the fluorine source is not yet present in the process, which allows safe handling, transporting and storing of the various precursors, while managing the time of incorporation of the fluorine source.

The next step, illustrated by the arrows 7 or 70 depending on whether solid precursor 5 is used immediately or it is a stored 6 solid precursor, consists of a heat treatment to inject fluorine, in an atomic and/or molecular form, to the solid precursor as soon as it is produced, according to reference 5, or to the stored solid precursor, according to reference 6. It should be noted that fluorine is injected only in step 7, 70 and not before.

In other words, step 7, 70 is carried out under fluorinated atmosphere. As examples, including but not limited to, we can list the following as fluorination agent: $F_2$, HF, $BrF_3$, $TbF_4$, $XeF_2$, $XeF_6$, $NH_4F$, $CoF_3$, $SbF_3$, $ArF_3$, $BrF_5$, CIF, $CIF_3$, $CIF_5$, $HFO_3S$, $AuF_3$, $IF_5$, $MnF_3$, $MnF_4$, NOF, $NO_2F$, $ClO_3F$, $PtF_6$, $SeF_4$, $AgF_2$, $SF_4$.

Heat treatment carried out during this step 7, 70 is performed between 100° C. and 1,000° C. for a period of at least 30 minutes under a fluorine atmosphere containing at least 1% fluorine. It is, in fact, not necessary for the atmosphere to be saturated with fluorine; the balance of the atmosphere may be an inert gas such as nitrogen.

Following examples of synthesis illustrate use of the process that is the purpose of the invention.

Example 1

$K_2SiF_6$: Mn(IV) is synthesised from $MnCl_2$, metallic K and Tetraethyl orthosilicate (TEOS). The solvent used is anhydrous ethanol. A K solution (3.6432 g) is added to a $MnCl_2$ solution (0.1713 g). After 1 hour of stirring under reflux, TEOS (9.3272 g) is added to the above solution. After 30 minutes of stirring under reflux, acetic acid (11.18 ml) is added to adjust the pH to 5. After 4 hours of reflux, salts are removed from the solution and the solution is evaporated until dry. The precursor thus obtained is heat-treated at 500° C. under a $F_2$ flow for 15 hours.

Example 2

$Na_2TiF_6$: Mn(IV) is synthesised from $MnCl_2$, metallic Na and Tetraethyl orthotitanate (TEOT). The solvent used is anhydrous isopropanol. A Na solution (0.7268 g) is added to a $MnCl_2$ solution (0.1817 g). After 1 hour of stirring under reflux, TEOT (3.6801 g) is added to the above solution. After 30 minutes of stirring under reflux, acetic acid (3.79 ml) is added to adjust the pH to 5. After 3 hours of reflux, salts are removed from the solution and the solution is evaporated until dry. The precursor thus obtained is heat-treated at 500° C. under a $F_2$ flow for 15 hours.

Example 3

$Na_3AlF_6$ is synthesised from metallic Na and aluminium isopropoxide. The solvent used is anhydrous methanol. Aluminium isopropoxide (4.9135 g) is added to a Na solution (1.6675 g). After 30 minutes of stirring under reflux, acetic acid (8.71 ml) is added to adjust the pH to 5. After 2 hours of reflux, the solution is cooled to 25° C. Into this, the powder of $Na_2TiF_6$: Mn(IV) obtained in Example 2 is dispersed in a molar ratio of 3:1 of $Na_2TiF_6$: Mn(IV). The dispersion thus obtained is evaporated and then heat-treated at 650° C. under a $F_2$ flow for 3 hours.

Example 4

$LiSrAlF_6$: Cr(III) is synthesised from lithium ethoxide, strontium isopropoxide, chromium acetylacetonate and aluminium isopropoxide. The solvent used is anhydrous isopropanol. To a solution of lithium ethoxide (0.7171 g), strontium isopropoxide (2.6132 g) and chromium acetylacetonate (0.1336 g), aluminium isopropoxide (2.5408 g) is added. After 30 minutes of stirring under reflux, acetic acid (3.18 ml) is added to adjust the pH to 5. After 6 hours of reflux, the solution is cooled to 25° C. Into this, the powder of $K_2SiF_6$: Mn(IV) obtained in Example 1 is dispersed in a molar ratio of 9:1 of $K_2SiF_6$: Mn(IV). The dispersion thus obtained is evaporated and then heat-treated at 600° C. under a $F_2$ flow for 10 hours.

Since the percentage of gaseous fluorine stays low, it helps in improving safety. Moreover, heat treatment is preferably carried out in a dynamic manner, i.e. under fluorinated gas flow. Alternatively, it is carried out in a static manner: step 7, 70 then takes place in a closed volume, under fluorinated atmosphere.

At the end of step 7 or 70, depending on the source of the solid precursor, 5 or 6, we get crystalline powder 8. Obtained particle size depends on the type of the solid precursor 5 and on the conditions of the heat treatment 7. Generally, the particle size is close to 200 nm. Particles may be in the form of aggregates whose size is around one micron. Such particle size is especially suited to enable shaping and depositing the phosphor, for example, on a LED 9.

It is possible to increase the particle size if necessary, by depositing one or more additional layers. To do this, just bring the solid particles 8 in contact with the liquid precursor 2 or 3, by dispersing the former within the latter, and by performing at least one other step 4 of eliminating the solvent followed by a heat treatment step 7, 70. In this case, this additional cycle is performed on a mixture of liquid precursor 2 or 3 and particles 8, therefore under conditions which are not necessarily the same as those of the initial step 7, 70. It is understood that the cycle is repeated several times, as necessary.

The addition of at least one more cycle, or even several, makes it possible to introduce other characteristics to powder 8, by modifying the nature of the liquid precursor 2 or 3. It is thus possible to introduce other functional properties to powder 8, for example a second luminescence in a spectral range different from the original one of powder 8. Thus, one can achieve double luminescence, i.e. in a colour range other as red, for example yellow, by introducing a liquid precursor which does not contain manganese. Examples include a mixture of fluorinated chromium and fluorinated manganese.

The process is also used to protect the powder from aggression of its immediate environment by depositing a passivation layer during the additional cycle(s). For example, by reintroducing powder 8 in a liquid precursor 2 or 3 of $Na_3AlF_6$, also known as the synthetic cryolite, the particles are coated with a protective layer.

It is also possible to deposit one or more layers on the particles imparting other characteristics to them, such as, but not limited to, magnetic properties or a characteristic that ensures identification and traceability of the final product.

It is also possible to coat other particles, whether or not luminescent, and to impregnate ceramic preform type objects by dispersing them in the liquid precursor 2 or 3 and by carrying out at least one evaporation 4 and heat treatment 7 cycle. Alumina particles $Al_2O_3$ coated with $K_2SiF_6$: Mn can be cited as a non-limiting example. In other words, fluorescence characteristics are imparted to the alumina particles.

Such a process is therefore flexible and easy to use, which allows making different phosphors under fully safe conditions.

For different steps of production of a solid precursor (step b) and of crystallisation (step c), such a process allows using the liquid and solid precursors respectively either directly from the preceding step or from storage, 3 or 6, or a mixture, in variable proportions, of precursors obtained partly from storage and partly from the preceding step. It is thus possible to regulate production, at each of the steps b) and c), by adjusting, if required, the quantity of the precursors used from stored precursors 3 or 6.

The invention claimed is:

1. A sol-gel process for synthesizing a luminescent material of a general formulation AxByFz:Mn, comprising:
    a) producing a liquid precursor in alcoholic solution by mixing metal reagents of elements A and B, said metal reagents being alkoxides, with manganese, wherein the mixing is carried out at a pH between 1 and 7,
    b) obtaining a solid precursor from the liquid precursor obtained in step a) by eliminating a solvent from the liquid precursor,
    c) crystallizing the solid precursor obtained in step b) by heat treatment in a fluorinated atmosphere containing at least 1% by volume of fluorine, and
    d) recovery of a fluorescent crystalline powder obtained at the end of step c),
    wherein, in the general formulation, A is chosen from a group consisting of Lithium, Sodium, and Potassium, or a combination thereof; B is chosen from a group consisting of Aluminum, Silicium, and Titanium; x is in a range of $0<x\leq5$; y is in a range of $0<y\leq2$; and z is in a range of $5\leq z\leq7$, and
    wherein fluorine is not introduced in any form to the liquid precursor during step a) or to the solid precursor during step b).

2. The process of claim 1, wherein during step a) the pH is maintained between 1 and 7 by adding an acid, selected from carboxylic acids selected from a group consisting of formic acid, acetic acid, propionic acid, citric acid, tartaric acid, oxalic acid; from sulfonic acids selected from a group consisting of benzenesulfonic acid or paratoluenesulfonic acid; from anhydrous forms of acids; or from hydrochloric acid in solution in ethyl ether, in dioxane or in gaseous form.

3. The process of claim 2, wherein during step a) the pH is maintained between 1 and 7 by adding said acetic acid.

4. The process of claim 1, wherein step a) is carried out at a temperature between 15° C. and the boiling temperature of the solvent used.

5. The process of claim 1, wherein the liquid precursor obtained in step a) is, if necessary, stored for subsequent use in step b).

6. The process of claim 1, wherein the solid precursor obtained in step b) is, if necessary, stored for subsequent use in step c).

7. The process of claim 1, wherein step c) is carried out at a temperature between 100° C. and 1,000° C. for at least 30 minutes.

8. The process of claim 1, wherein a fluorinating agent is used in step c) for generating the fluorinated atmosphere and is selected from a group consisting of $F_2$, HF, $BrF_3$, $TbF_4$, $XeF_2$, $XeF_4$ and $XeF_6$, $NH_4F$, $NH_4HF_2$, $CoF_3$, $SbF_3$, $SbF_5$, $ArF_3$, KrF, $BrF_5$, ClF, $ClF_3$ and $ClF_5$, $HFO_3S$, $AuF_3$, $IF_5$, $MnF_3$ and $MnF_4$, NOF and $NO_2F$, $NF_3$, $ClO_3F$, $PtF_6$, $SeF_4$, $SiF_4$, $AgF_2$, $SF_4$, $SF_6$, KF, $PbF_2$, $ZnF_2$, $SnF_2$, and $CdF_2$, alone or in combination.

9. The process of claim 1, wherein during step c), the fluorinated atmosphere is static or dynamic.

10. The process of claim 1, wherein at the end of step d) the resulting particles are reintroduced in the liquid precursor to begin a further iteration of steps a) to d).

11. The process of claim 10, wherein during step a) the liquid precursor is selected to provide double luminescence for magnetic properties or for other characteristics.

\* \* \* \* \*